Dec. 22, 1959     J. M. CURTIN     2,917,945
VARIABLE DETENT MECHANISM
Filed March 16, 1956     2 Sheets-Sheet 1
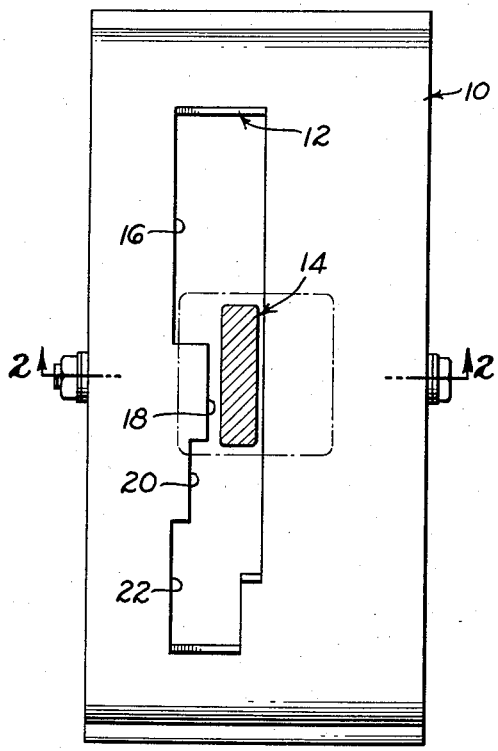
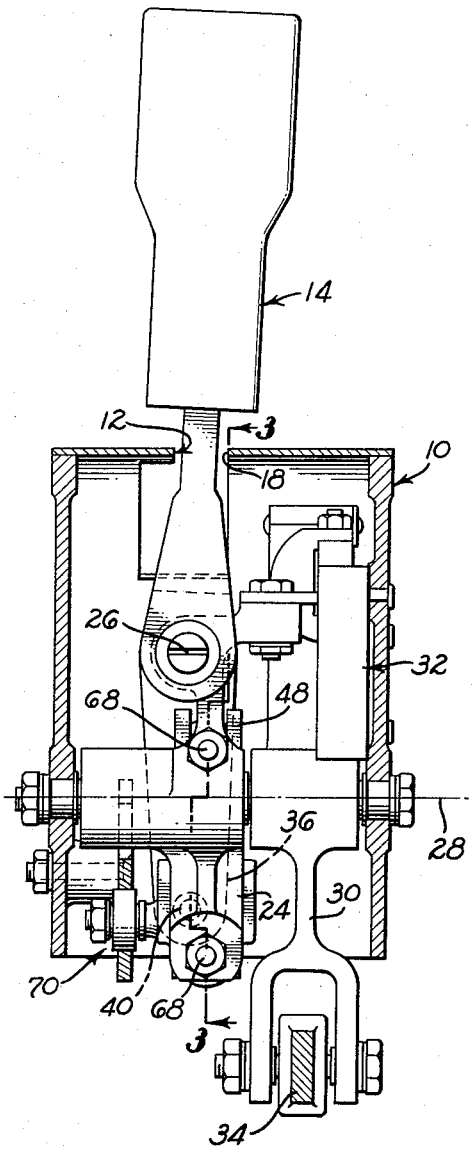
INVENTOR.
JOHN M. CURTIN
BY HIS ATTORNEYS.
HARRIS, KIECH, FOSTER & HARRIS Dec. 22, 1959   J. M. CURTIN   2,917,945
VARIABLE DETENT MECHANISM
Filed March 16, 1956   2 Sheets-Sheet 2
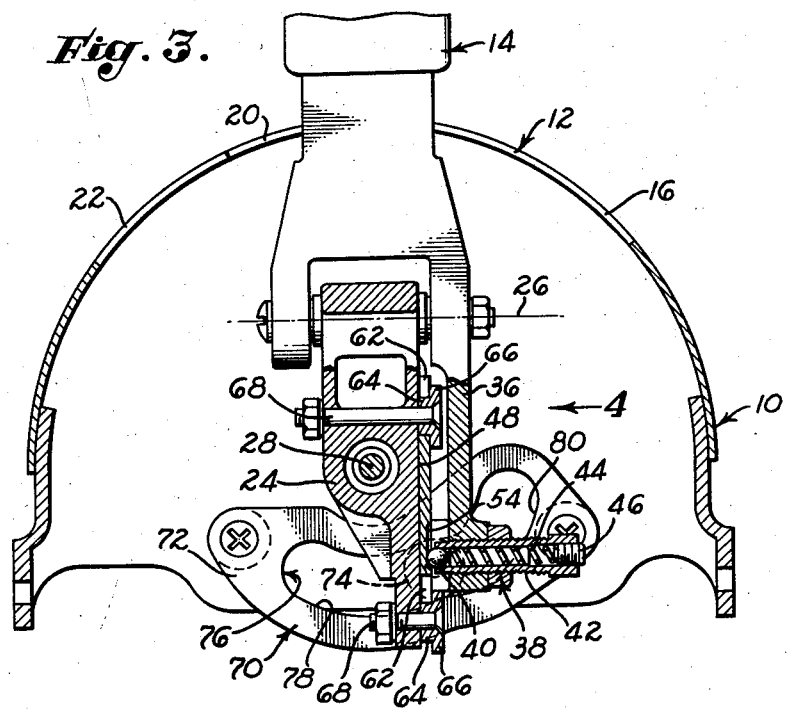
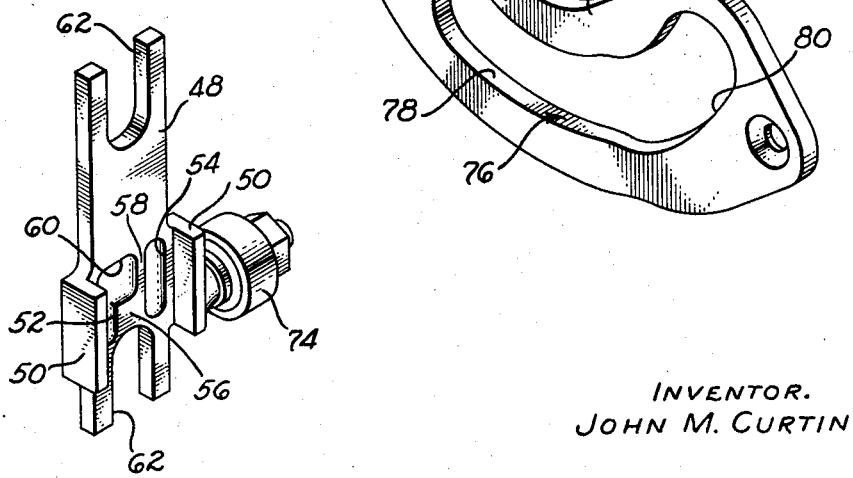
INVENTOR.
JOHN M. CURTIN
BY HIS ATTORNEYS.
HARRIS, KIECH, FOSTER & HARRIS

United States Patent Office 2,917,945
Patented Dec. 22, 1959

2,917,945

VARIABLE DETENT MECHANISM

John M. Curtin, Studio City, Calif., assignor to Hansen-Lynn Co., Inc., Burbank, Calif., a corporation of California Application March 16, 1956, Serial No. 572,070

12 Claims. (Cl. 74—532)

The present invention relates in general to detent mechanisms and, more particularly, to a detent mechanism for variably controlling the position of a member associated therewith, a primary object of the invention being to provide a detent mechanism of this general nature.

A general object of the invention is to provide a variable detent mechanism including two detent elements one of which is selectively engageable with different portions of the other, and including means for mounting each detent element for movement relative to the other.

Another object is to provide a variable detent mechanism which includes two detent elements respectively mounted on two members one of which is movably mounted on the other, the detent element which is mounted on such other member being movable relative thereto so as to bring various portions of such detent element into operative relation with the detent element mounted on the one member.

Still another object of the invention is to provide a variable detent mechanism which includes a recessed detent plate movably mounted on a pivoted lever, a detent element carried by a handle which is pivotally mounted on the lever, and means responsive to pivotal movement of the lever for moving the detent plate relative to the lever. With this construction, the detent element on the handle is selectively engageable with different portions of the detent plate in response to pivotal movement of the handle relative to the lever for each position of the lever relative to its supporting structure, the detent element on the handle being selectively engageable with still other portions of the detent plate as a result of movement of the detent plate relative to the lever in response to pivotal movement of the lever relative to the supporting structure. Thus, the variable detent mechanism of the invention provides a range of positions of the handle relative to the lever, the operative portions of the detent plate depending upon the position of the lever relative to its supporting structure, which is an important feature.

Another object is to provide an apparatus of the foregoing character wherein the handle controls the position of the lever.

A further object of the invention is to provide an apparatus wherein the means for moving the detent plate relative to the lever in response to handle-induced pivotal movement of the lever relative to the supporting structure includes a cam carried by the supporting structure and a cam follower connected to the detent plate.

Still another object is to provide an apparatus wherein the aforementioned cam has a variable radius relative to the pivot axis of the lever.

Another object of the invention is to provide an apparatus which includes means for limiting pivotal movement of the handle relative to the lever in certain positions of the lever relative to the supporting structure so as to limit movement of the detent element on the handle relative to the detent plate on the lever.

The foregoing objects, features and results of the present invention, together with various other objects, features and results thereof which will be apparent to those skilled in the art in the light of this disclosure, may be attained with the exemplary embodiment of the invention illustrated in the accompanying drawings and described in detail hereinafter. Referring to the drawings:

Fig. 1 is a plan view of a throttle control quadrant for jet aircraft which embodies the variable detent mechanism of the invention;

Fig. 2 is a sectional view taken along the arrowed line 2—2 of Fig. 1;

Fig. 3 is a sectional view taken along the arrowed lines 3—3 of Figs. 2 and 4;

Fig. 4 is a fragmentary sectional view taken in the direction indicated by the arrow 4 of Fig. 3; and Figs. 5 and 6 are isometric views of different components of the variable detent mechanism of the invention.

For the purpose of illustrating the utility of the variable detent mechanism of the present invention, it is shown incorporated in a throttle control quadrant for jet aircraft which includes a supporting structure in the form of a housing 10 having a stepped slot 12 therein in which a handle 14 is movable. Referring to Fig. 1 of the drawings for a general discussion of illustrative functions performed by the handle 14 in various positions in the slot 12, when the handle is adjacent the right edge of a zone 16 of the slot, the engine of the aircraft develops a relatively high thrust, the thrust increasing as the handle is moved upwardly. Movement of the handle to the left side of the slot zone 16 energizes the afterburner of the aircraft. When the handle 14 is in an intermediate zone 18 of the slot, the thrust developed by the engine is relatively low, the slot zone 18 being relatively narrow so that the handle cannot be moved to the left into an afterburner energizing position under such conditions. With the handle 14 adjacent the right edge of an intermediate slot zone 20, the engine of the aircraft is set for idling. When the handle 14 is in a zone 22 of the slot 12 and adjacent the right edge of such zone, the engine is cut off. Movement of the handle 14 to the left edge of the slot zone 22 results in starting of the engine. As will be explained hereinafter, the variable detent mechanism of the invention controls such transverse movement of the handle 14 relative to the slot 12.

Considering the present invention now in more detail, the handle 14 is mounted on a lever 24 for pivotal movement relative to such lever about a handle axis 26. This axis extends generally in the direction of the length of the slot 12 so that pivotal movement of the handle 14 relative to the lever 24 about the handle axis results in the hereinbefore outlined transverse movement of the handle relative to the slot. The lever 24 is mounted on the housing 10 for pivotal movement relative thereto about a lever axis 28 which extends transversely of the handle axis 26 and which is located substantially at the center of the curvature of the slot 12, as best shown in Fig. 3 of the drawings, so that the handle moves along the slot as the lever pivots.

Thus, with this construction, the handle 14 is pivotable transversely of the slot 12 relative to the lever 24 and is pivotable in the direction of the slot 12 with the lever 24, the latter being coupled to a lever 30, which is also pivotable about the lever axis 28, by a coupling mechanism 32 which need not be described herein. Pivotally connected to the lever 30 is a link 34 for controlling the engine of the aircraft.

As best shown in Fig. 3 of the drawings, the handle 14 is provided with an arm 36 which carries detent means 38. This detent means includes a ball detent element 40 in a tube 42 threaded through the arm 36 of the handle 14, the ball detent element being spring biased axially of the tube 42 by a compression spring 44 seated at one end against the detent element and seated at its other end against an adjusting screw 46 threaded into the tube 42 and serving to adjust the spring bias applied to the detent element.

The ball detent element 40 is selectively engageable with different portions of another detent element, specifically a detent plate 48 carried by the lever 24 and oriented perpendicularly of the path of movement of the ball detent element relative to the arm 36 of the handle 14. The detent plate 48 is an elongated element and the ball detent element 40 is movable transversely thereof in response to pivotal movement of the handle 14 relative to the lever 24, such transverse movement of the ball detent element being limited by engagement of the tube 42 with stop lugs 50 carried by the detent plate.

The detent plate 48 is provided therein, between the lugs 50, with two recesses 52 and 54 which extend lengthwise of the detent plate. The recesses 52 and 54, which are adapted to receive the ball detent element 40 therein are separated by a relatively wide land 56 at one end and by a relatively narrow land 58 at the other. The narrow land 58 results from the provision of an enlargement 60 at one end of the recess 52, this recess being generally L-shaped.

It will be apparent that by pivoting the handle 14 relative to the lever 24 about the handle axis 26, the ball detent element 40 may be moved from one of the recesses 52 and 54 to the other across either the wide land 56 or the narrow land 58, depending on which of these lands is in alignment with the path of movement of the ball detent element across the detent plate 48. In order to provide for selective movement of the ball detent element 40 across the lands 56 and 58, the detent plate 48 is mounted on the lever 24 for movement along a path which intersects the handle axis 26. More particularly, the detent plate 48 is provided in its ends with elongated notches 62 which receive cylindrical guide elements 64 on the lever 24 therein. The guide elements 64 are provided with annular flanges 66 under which the notched ends of the detent plate 48 are inserted to retain the detent plate in engagement with one side of the lever 24, the flanged guide elements 64 being secured to the lever by bolts 68.

Considering the manner in which the detent plate 48 is shifted relative to the lever 24 to selectively align the lands 56 and 58 with the path of movement of the ball detent element 40 across the detent plate, the invention provides cam means 70 for moving the detent plate relative to the lever in response to pivotal movement of the lever relative to the housing 10. The cam means 70 includes a cam 72 carried by the housing 10 and includes a cam follower 74 of the roller type mounted on the detent plate 48, i.e., on one of the lugs 50 thereon. The cam 72 is provided with a cam slot 76 therein having two zones 78 and 80 of different radii relative to the lever axis 28, the cam zone 78 having the shorter radius. When the cam follower 74 is in engagement with the cam zone 78, the wide land 56 is in alignment with the ball detent element 40 and, when the cam follower is in engagement with the cam zone 80, the narrow land 58 is in alignment with the ball detent element. Since the detent plate 48 is shifted in response to pivotal movement of the lever 24, it will be apparent that the position of the lever about the lever axis 28 determines the portions of the detent plate 48 engaged by the ball detent element 40 as the handle 14 is pivoted relative to the lever 24 about the handle axis 26.

Considering the operation of the variable detent mechanism of the invention, when the handle 14 is in the zone 22 of the slot 12, the cam follower 74 is in the cam zone 80 of larger radius so that the narrow land 58 is aligned with the ball detent element, whereby this detent element is freely movable within the enlargement 60 of the recess 52 in the detent plate 48 to permit free movement of the handle across the slot zone 22 between the hereinbefore-discussed starting and cut off positions. Under such conditions, the right edge of the slot zone 22, as viewed in Fig. 1 of the drawings, limits pivotal movement of the handle 14 relative to the lever 24 so that the ball detent element 40 cannot be moved across the land 58 into the recess 54.

However, by pivoting the handle-lever combination 14, 24 until the handle is in the slot zone 20, the cam follower 74 still being in the cam zone 80 of larger radius at this point, the handle may be pivoted relative to the lever 24 into a position adjacent the right edge of the slot zone 20 to cause the ball detent element 40 to move from the enlargement 60 of the recess 52 across the narrow land 58 into the recess 54, this position of the handle corresponding to an idling condition for the engine.

As the lever 24 is pivoted relative to the housing 10 in response to movement of the handle 14 through the slot zone 18, the cam follower 74 enters the cam zone 78 of smaller radius to shift the detent plate 48 into a position such that the wide land 56 is in alignment with the ball detent element 40. As hereinbefore pointed out, the slot zone 18 is relatively narrow so that the handle cannot be pivoted to the left, as viewed in Fig. 1 of the drawings, far enough to move the ball detent element 40 across the land 56 into the recess 52.

However, when the handle 14 is in the slot zone 16, the handle may be pivoted relative to the lever 24 to move the ball detent element 40 across the wide land 56 into either of the recesses 52 and 54 in the detent plate 48. When the handle 14 is adjacent the right edge of the slot zone 16, as viewed in Fig. 1 of the drawings, so that the ball detent element 40 is in the recess 54 in the detent plate 48, the engine of the aircraft is developing a relatively high thrust, but the afterburner is de-energized. Moving the handle 14 across the slot zone 16 to the left edge thereof results in energization of the afterburner, the ball detent element 40 being in the recess 52 under such conditions.

Thus, the detent mechanism of the present invention variably controls the pivoting of the handle 14 relative to the lever 24, the angular position of the lever about the lever axis 28 determining which portions of the detent plate 48 are engageable by the ball detent element 40. In the particular environment illustrated, wherein the slot zones 16, 18, 20 and 22 vary in width, the edges of the slot 12 also serve to determine the range of pivotal movement of the handle 14 relative to the lever 24.

While the recesses 52 and 54 are shown as being of constant depths, it will be understood that this is not necessary. For example, by making the recess 54 tapered from one end thereof to the other in such a manner that the ball detent element 40 is in the deeper end thereof when the handle 14 is in the slot zone 16, the force required to shift the handle into and out of the "afterburner" position will be higher than that required to shift the handle laterally in the "idle" range, wherein the element 40 is in the shallow end of the recess 54, which is desirable. Also, if the enlargement 60 of the recess 52 is tapered laterally of this recess so that the ball detent element 40 tends to move downwardly to one side thereof, the handle 14 is inherently biased to one side when in the "start" position in the zone 22, which is also desirable.

Although I have disclosed an exemplary embodiment of my invention herein for purposes of illustration, it will be understood that various changes, modifications and substitutions may be incorporated in such embodiment without departing from the spirit of the invention as defined by the claims hereinafter appearing.

I claim as my invention:

1. In combination: a supporting structure; two members one of which is movably mounted on the other, said other member being movably mounted on said supporting structure; one detent element mounted on said one member; another detent element movably mounted on said other member, various portions of said other detent element being engageable by said one detent element in response to relative movement of said members; and means responsive to movement of said other member relative to said supporting structure for moving said other detent element relative to said other member, including a cam carried by said supporting structure and a cam follower connected to said other detent element.

2. In combination: a supporting structure; a lever pivotally mounted on said supporting structure; a handle pivotally mounted on said lever; a detent element carried by said handle; a detent plate movably mounted on said lever and provided therein with recesses selectively engageable by said detent element in response to pivotal movement of said handle relative to said lever; and means responsive to pivotal movement of said lever relative to said supporting structure for moving said detent plate relative to said lever.

3. In combination: a supporting structure; a lever pivotally mounted on said supporting structure; a handle pivotally mounted on said lever; a detent element carried by said handle; a detent plate movably mounted on said lever and provided therein with recesses selectively engageable by said detent element in response to pivotal movement of said handle relative to said lever; and means responsive to pivotal movement of said lever relative to said supporting structure for moving said detent plate relative to said lever, including a cam carried by said supporting structure and a cam follower connected to said detent plate.

4. In combination: a supporting structure; a lever mounted on said supporting structure for pivotal movement about a lever axis; a handle mounted on said lever for pivotal movement about a handle axis extending transversely of said lever axis; a detent element mounted on said handle; a detent plate mounted on said lever for movement along a path perpendicular to said handle axis, said detent plate being provided therein with recesses selectively engageable by said detent element in response to pivotal movement of said handle relative to said lever; and means responsive to pivotal movement of said lever relative to said supporting structure for moving said detent plate relative to said lever along said path.

5. In combination: a supporting structure; a lever mounted on said supporting structure for pivotal movement about a lever axis; a handle mounted on said lever for pivotal movement about a handle axis extending transversely of said lever axis; a detent element mounted on said handle; a detent plate mounted on said lever for movement along a path perpendicular to said handle axis, said detent plate being provided therein with recesses selectively engageable by said detent element in response to pivotal movement of said handle relative to said lever; and means responsive to pivotal movement of said lever relative to said supporting structure for moving said detent plate relative to said lever along said path, including a cam carried by said supporting structure and a cam follower connected to said detent plate.

6. In combination: a supporting structure; a lever mounted on said supporting structure for pivotal movement about a lever axis; a handle mounted on said lever for pivotal movement about a handle axis extending transversely of said lever axis; a detent element mounted on said handle; a detent plate mounted on said lever for movement along a path perpendicular to said handle axis, said detent plate being provided with two spaced recesses therein which extend in a direction parallel to said path and which are selectively engageable by said detent element in response to pivotal movement of said handle relative to said lever, said detent plate providing wide and narrow lands between said recesses at opposite ends thereof, respectively; and means responsive to pivotal movement of said lever relative to said supporting structure for moving said detent plate relative to said lever along said path.

7. In combination: a supporting structure; a lever mounted on said supporting structure for pivotal movement about a lever axis; a handle mounted on said lever for pivotal movement about a handle axis extending transversely of said lever axis; a detent element mounted on said handle; a detent plate mounted on said lever for movement along a path perpendicular to said handle axis, said detent plate being provided with two spaced recesses therein which extend in a direction parallel to said path and which are selectively engageable by said detent element in response to pivotal movement of said handle relative to said lever, said detent plate providing wide and narrow lands between said recesses at opposite ends thereof, respectively; and means responsive to pivotal movement of said lever relative to said supporting structure for moving said detent plate relative to said lever along said path, including a cam carried by said supporting structure and a cam follower carried by said detent plate.

8. In combination: a supporting structure; a lever mounted on said supporting structure for pivotal movement about a lever axis; a handle mounted on said lever for pivotal movement about a handle axis extending transversely of said lever axis; a detent element mounted on said handle; a detent plate mounted on said lever for movement along a path perpendicular to said handle axis, said detent plate being provided with two spaced recesses therein which extend in a direction parallel to said path and which are selectively engageable by said detent element in response to pivotal movement of said handle relative to said lever, said detent plate providing wide and narrow lands between said recesses at opposite ends thereof, respectively; and means responsive to pivotal movement of said lever relative to said supporting structure for moving said detent plate relative to said lever along said path, including a cam carried by said supporting structure and a cam follower carried by said detent plate, said cam having two different radii relative to said lever axis.

9. The combination defined in claim 2 including stop means engageable by said handle for limiting pivotal movement of said handle relative to said lever.

10. The combination defined in claim 2 wherein at least one of said recesses is of constant depth.

11. The combination defined in claim 2 wherein at least one of said recesses is of variable depth.

12. The combination set forth in claim 4 including means mounting said detent plate on said lever for straight-line sliding movement along said path.

References Cited in the file of this patent

UNITED STATES PATENTS

| | | |
|---|---|---|
| 748,156 | Bement | Dec. 29, 1903 |
| 893,954 | Van Hoffel | July 21, 1908 |
| 902,560 | Coldwell | Nov. 3, 1908 |
| 1,048,968 | Holst | Dec. 31, 1912 |
| 1,497,569 | Klausmeyer | June 10, 1924 |
| 1,847,048 | Orr | Feb. 23, 1932 |
| 1,861,937 | Philips | June 7, 1932 |
| 2,407,696 | Webster | Sept. 17, 1946 |
| 2,419,908 | Mott | Apr. 29, 1947 |
| 2,454,485 | Snell | Nov. 23, 1948 |
| 2,481,167 | Siever | Sept. 6, 1949 |
| 2,540,427 | Charles et al. | Feb. 6, 1951 |
| 2,660,278 | Landwier | Nov. 24, 1953 |
| 2,667,247 | May | Jan. 26, 1954 |
| 2,810,050 | Johnson | Oct. 15, 1957 |
| 2,855,800 | Curtin | Oct. 14, 1958 |